United States Patent [19]
Harwood

[11] 3,855,970
[45] Dec. 24, 1974

[54] AQUARIUM

[76] Inventor: Lee M. Harwood, 304 Elm St., San Carlos, Calif. 94070

[22] Filed: Apr. 2, 1973

[21] Appl. No.: 347,034

[52] U.S. Cl. .................................................. 119/5
[51] Int. Cl. ............................................ A01k 63/00
[58] Field of Search ................. 119/2, 3, 5; 210/169

[56] References Cited
UNITED STATES PATENTS

| | | | |
|---|---|---|---|
| 3,146,195 | 8/1964 | Berardi | 119/5 X |
| 3,387,587 | 6/1968 | Kelley et al. | 119/2 |
| 3,465,718 | 9/1969 | Handman et al. | 119/2 |
| 3,512,646 | 5/1970 | Willinger | 119/5 X |
| 3,557,753 | 1/1971 | Dantoni | 119/5 X |

*Primary Examiner*—Antonio F. Guida
*Assistant Examiner*—J. N. Eskovitz
*Attorney, Agent, or Firm*—Townsend and Townsend

[57] ABSTRACT

An improved aquarium for fish capable of living only in water in a given temperature range. The aquarium has a heat exchange coil therein near its bottom and the coil is coupled to an external source of fluid, whereby the water in the aquarium and the fluid in the coil can be placed in heat exchange relationship to each other. In one form, the external source comprises a refrigeration unit, whereby the water in the aquarium can be cooled. In another form, the source comprises a closed circuit means for heating water to be directed through the coil, whereby the water in the aquarium can be heated. The coil is disposed in a water-receiving space below a biological filter and pump means externally of the aquarium removes water from the space and returns it to the aquarium at a location above the filter. The coil preferably comprises a metallic tube having a coating of heat-conductive plastic thereon.

8 Claims, 4 Drawing Figures

AQUARIUM

This invention relates to improvements in aquariums and, more particularly, to an aquarium having means thereon for keeping the water therein at a temperature within a predetermined range.

BACKGROUND OF THE INVENTION

Salt water fish are now being more and more sold for use in aquariums for home and office buildings. However, certain types of such fish require that the temperature of the water in which they live be within a range of temperatures. For instance, fish found off the Northern California Coast will continue to live only if the water is in the range of 45° to 54°. Thus, the water temperature of an aquarium in which such fish are placed must be cooled and maintained in the aforesaid range; otherwise, the fish will die within a relatively short time.

Other varieties of fish, such as those found in tropical zones, require water temperatures (about 78° to 80°F.) to be above that of normal room temperature (about 68° to 70°F.). Thus, when these fish are housed in an aquarium, the water therein must be heated and maintained at an elevated temperature to prevent the fish from dying.

Large aquariums, such as those owned and maintained by cities or states have used industrial-type refrigeration or heating equipment to cool or heat the water therein. However, such equipment is not suitable for relatively small aquariums, i.e., 50 to 100 gallons in volume, adapted for home and office use.

A need, therefore, has arisen for an aquarium suitable for home and office display of fish wherein the aquarium has means for keeping the water therein at a temperature in a desired range yet the aquarium itself is sufficiently simple and inexpensive in construction to make it attractive to prospective purchasers of the same.

SUMMARY OF THE INVENTION

The present invention is directed to an improved aquarium to achieve the foregoing aim. To this end, the aquarium includes an open top receptacle adapted to be placed on a supporting surface in the home or office. The receptacle has a shelf-like support near its bottom and spaced above the same to present a space in which a heat exchanger or coil is disposed. The coil is formed preferably from a metallic tube coated with a heat-conductive plastic, such as a vinyl or the like. The coil is coupled to a fluid source disposed externally of the receptacle. The source can be a refrigeration unit for cooling the fluid emanating therefrom or a heating unit to heat the fluid thereof.

A porous biological filter, such as sand, is disposed on the shelf-like support and effectively covers the same as well as the space containing the coil. A pump externally of the receptacle communicates with such space and operates to draw water out of the same after the water has entered the space through the filter from the region of the receptacle thereabove. The water is returned from the pump back to the receptacle at a location above the filter to thereby cause the water to circulate in the receptacle.

In either of the above two forms, the external fluid source can be thermostatically controlled as a function of the water temperature in the receptacle. Moreover, the source can be made sufficiently compact to permit it to be disposed near the receptacle in a minimum of space. Also, the coil itself can be made so that it provides for optimum heat transfer between the water in the receptacle and the fluid in the coil yet the fish in the receptacle are safe from toxic effects of any metallic parts forming the coil.

The primary object of this invention is to provide an improved aquarium of the type suitable for home and office display of fish which are sensitive to water temperatures wherein the aquarium includes a receptacle having a heat exchanger therein below a biological filter with the heat exchanger being coupled to a source of conditioned fluid so that the water in the receptacle will also be conditioned in accordance with the temperature requirements of the fish therein without causing a toxic atmosphere for the fish.

Another object of this invention is to provide an aquarium of the type described wherein the water in the receptacle can be cooled and maintained at a temperature in a predetermined range below room temperature yet the heat exchanger for cooling the water can be concealed within the receptacle and the source of coolant for the heat exchanger can be easily coupled thereto while such source is disposed in an out-of-the-way location adjacent to and externally of the receptacle itself.

A further object of this invention is to provide an aquarium of the aforesaid character wherein a source of heated fluid can be provided adjacent to and externally of the receptacle for supplying such heated fluid to the heat exchanger therein so that the water in the receptacle can be heated to a temperature in a range above room temperature to accommodate fish of the type which require relatively warm water to survive.

Other objects of this invention will become apparent as the following specification progresses, reference being had to the accompanying drawings for an illustration of the invention.

Figure 1:
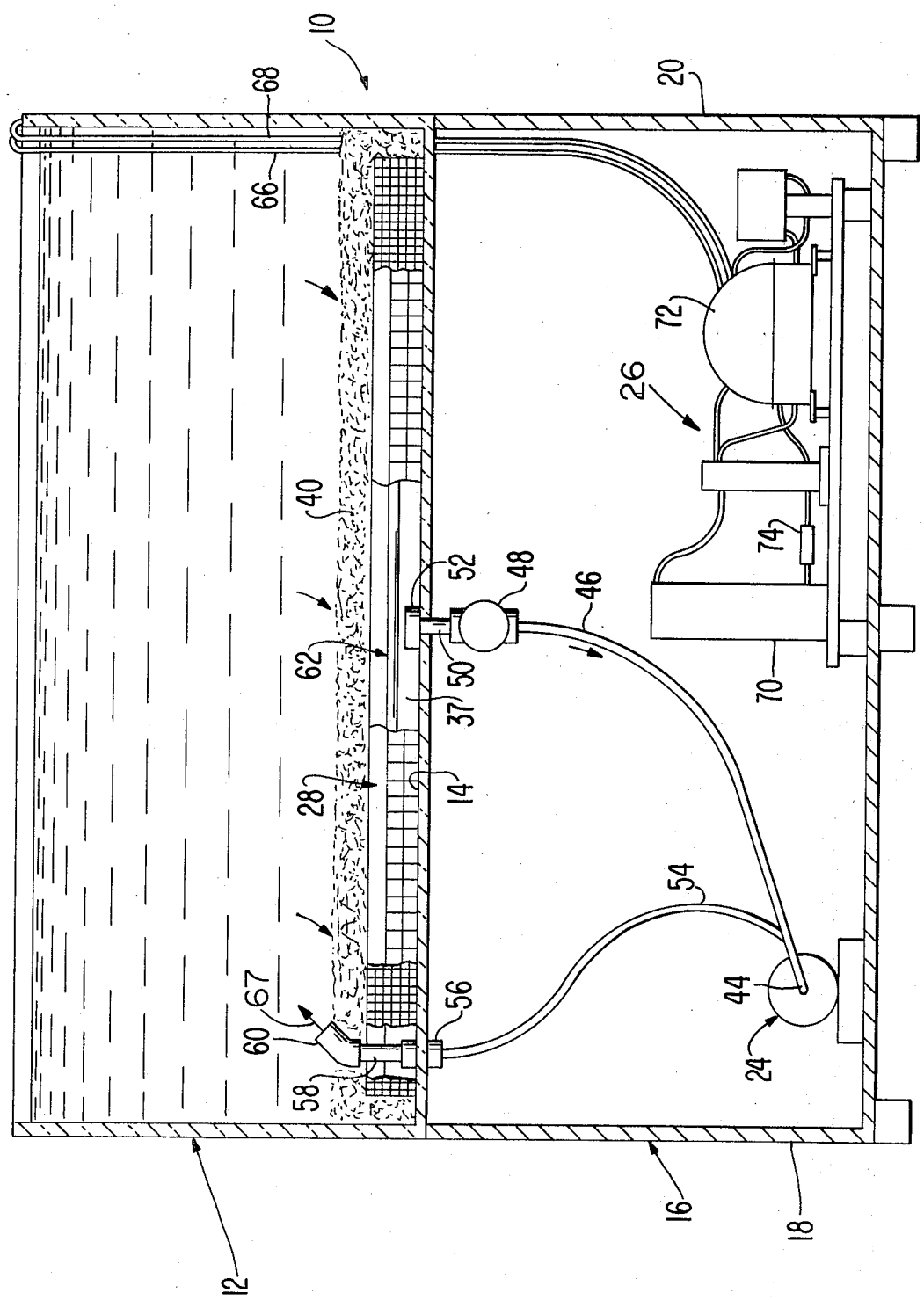
FIG. 1 is a side elevational view of the aquarium of this invention and utilizing a refrigeration unit whose evaporator is disposed in the aquarium receptacle for conditioning the water therein.

The aquarium of this invention is broadly denoted by the numeral 10 and includes an elongated, open top receptacle 12 of glass or other suitable transparent material. Receptacle 12 has a bottom 14 which rests upon the upper flat surface of a support 16 in the form of a table having upright legs 18 and a lower shelf 22 on which a fluid pump 24 and a water conditioning apparatus 26 are disposed.

A porous base 28 is disposed within receptacle 12 near the bottom thereof. Base 28 is formed of a material which is non-toxic to the fish to be placed in the aquarium and preferably is of a rigid plastic. It is formed of an upper, generally horizontal grid 30 provided with grid-like sides 32 which depend therefrom and engage bottom 14. Grid 30 is similar to a plastic grid used for diffusion of light from overhead light fixtures. Thus, it has mutually perpendicular crosspieces 34 and 36 which are bonded together in a suitable manner. Sides 32 space grid 30 above but in proximity to bottom 14, yet the grid and the bottom form a space 37 therebetween.

A porous screen 38 is placed on grid 30 to support a bio-filter 40 thereon. Screen 38 is also of a non-toxic material and preferably is of vinyl or the like. The mesh of the screen is sufficiently small to prevent the particles of filter 40, which is comprised of a mass of silica or the like, to pass through grid 30 and into space 37. As shown in FIG. 1, the length of grid 30 is slightly less than the length of receptacle 12. Thus, filter 40 effectively surrounds the top and sides of base 28.

The filter is preferably about three inches thick and has a substantially horizontal upper surface forming the lower boundary of the fish-containing portion of aquarium 10. The filter allows water from above to pass therethrough and into space 37. The weight of the water above the filter is sufficient to force the water straight downwardly into and through the filter uniformly along the same rather than at localized areas thereof. Thus, the uniform shape of the filter is maintained.

Water is caused to circulate in receptacle 12 and to pass through space 37 by means of pump 24. The latter has an inlet 44 to which a tube 46 is coupled. Tube 46 has a valve 48 coupled thereto to control water flow therethrough. Inlet 50 of tube 46 communicates with space 37 by a fitting 52 coupled to bottom 14 adjacent to the center thereof as shown in FIG. 1 and extending through a first hole therein.

Pump 24 has an outlet to which is coupled a tube 54, the latter having an outlet coupled to a fitting 56 connected to bottom 14 and extending through a second hole therein near one end thereof (FIG. 1). A tube 58 coupled to fitting 56 has an upper nozzle 60 which extends through grid 30 and filter 40 so that the nozzle, whose acquarium is directly adjacent to and above the upper level of the filter, can discharge water into the region 61 above the filter, along an inclined path denoted by the numeral 67 (FIG. 1) thereby permitting circulation of the water in such region.

Means for conditioning the water in receptacle 12 includes a tubular heat exchanger 62 which, for purposes of illustration, comprises a planar coil formed of a number of generally parallel stretches 64 of a tube which is disposed and extends over a major portion of space 37. Heat exchanger 62 is of a material which is non-toxic to fish to be placed in receptacle 12. Preferably, it is formed of an inner, copper tube 63 surrounded by an outer, plastic tube 65. The outer tube can be of a heat-shrinkable plastic material, such as vinyl, so that, after it is loosely placed on the copper tube, it can be heated to shrink about the same. The two tubes thus form an efficient, heat-conductive unit which does not deteriorate. Copper is selected for the inner tube because it does not corrode by fluid passing therethrough. While copper is toxic to fish, the plastic outer tube prevents the toxicity of copper from contaminating the water in receptacle 12.

Figure 2:
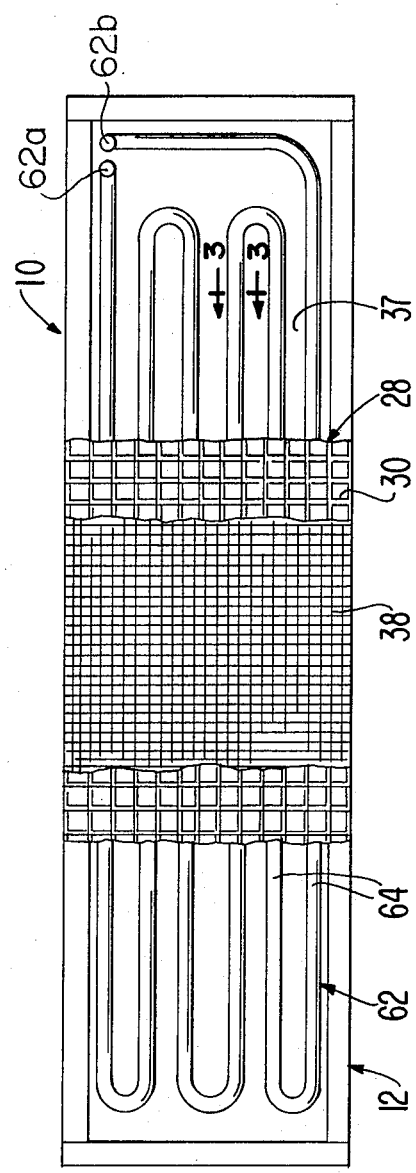
FIG. 2 is a top plan view of the aquarium, showing the heat exchanger therein and with the bio-filter of the aquarium removed.
Figure 3:
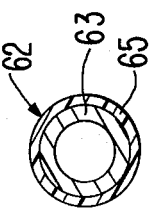
FIG. 3 is cross-sectional view of the heat exchanger taken along line 3—3 of FIG. 2.
Figure 4:
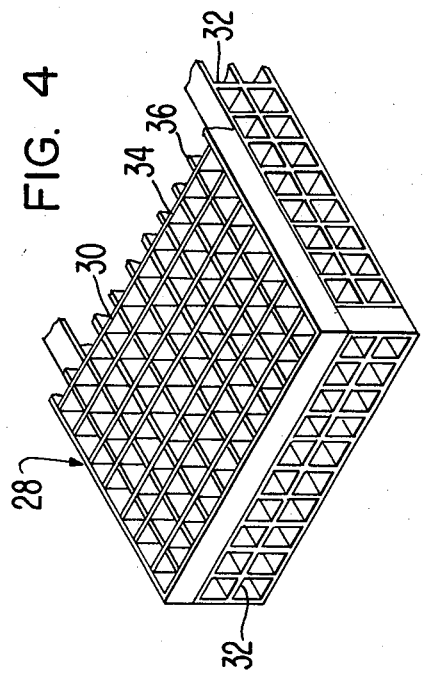
FIG. 4 is a fragmentary, perspective view of the filter support for the lower, interior part of the aquarium.

Heat exchanger 62 is connected at its ends 62a and 62b (FIG. 2) by a pair of tubes 66 and 68 to the inlet and outlet, respectively, of water conditioning apparatus 26. For purposes of illustration in FIG. 1, apparatus 26 comprises a standard refrigeration unit including a condenser 70 (the outlet), a compressor 72 (the inlet), an expansion valve 74, and associated tubing interconnecting the same. Heat exchanger 62 thereby forms the evaporator for the refrigeration unit. The refrigeration unit operates to direct a coolant, such as Freon, into heat exchanger 62 with the Freon in a relatively cooled condition. The water surrounding heat exchanger 62 in space 37 is thereby in heat exchange relationship to the coolant and the latter absorbs the heat from the water, thereby reducing the heat content thereof and cooling the same. A thermostat (not shown) responsive to the temperature of the water in receptacle 12 can be used to control the operation of refrigeration unit 26 to keep the water temperature within a predetermined range.

In the alternative, water conditioning apparatus 26 can comprise a source (not shown) of a heated fluid, such as hot water, so that, instead of cooling the water in receptacle 12 as described above, the water can be heated. Thus, aquarium 10 is made suitable for housing tropical fish whose water habitat must have a temperature above room temperature. To this end, apparatus 26 can comprise a closed-circuit source of hot water which circulates through heat exchanger 62 for heating the water in space 37. The source is self-contained and is electrically heated and thermostatically controlled. The source has a quantity of hermetically sealed water and an electrical resistance element which heats the water, causing it to move by convection toward and through heat exchanger 62. Water heaters of this type have been used for heating individual rooms.

In operation, and assuming that the water in receptacle 12 is to be cooled, the various parts of aquarium 10 are connected in the manner shown in FIG. 1. With the refrigeration unit forming apparatus 26 in operation and responsive to the thermostat in the water in aquarium 10, water is continuously pumped out of space 37 by pump 24 and returned to receptacle 12 by means of nozzle 60 as the water continuously passes through filter 40 and into space 37.

The coolant passing from the refrigeration unit and into and through heat exchanger 62 cools the water in space 37 as the water is drawn out of the space by pump 24 and returned to the receptacle by way of nozzle 60 into the region above the filter. The refrigeration unit turns on and off under the influence of the thermostat disposed in the water at a suitable location. In this way, the water temperature can be kept within a desired range to thereby sustain the fish in the aquarium. The operation of aquarium 10 can continue uninterruptedly because there is no toxic materials in the water which would otherwise harm the fish. The fish, therefore, exist in their natural habitat.

If the water is to be heated, the water conditioning unit 26 will be in the form of a source of heated fluid, such as hot water and the aquarium will function as mentioned above.

I claim:

1. An aquarium comprising: a receptacle adapted to contain a quantity of water in which fish are to be placed, the receptacle having a bottom; means in the receptacle for forming a water-receiving space adjacent to said bottom; a porous filter mounted on said forming means and disposed to permit water to pass into said space from a region above the filter; pump means coupled with the receptacle near the center of said bottom for drawing water out of the space; means coupled with said pump means for directing water therefrom back into the receptacle through the bottom near one end thereof and into said region along an inclined path from a location adjacent to the upper level of said filter; a tubular heat exchanger in said space for conditioning water therein when a conditioned fluid flows through the heat exchanger; and means externally of the receptacle and coupled to the heat exchanger for conditioning a fluid and directing the same through said heat exchanger.

2. An aquarium as set forth in claim 1, wherein said heat exchanger comprises a planar coil having a pair of opposed ends, said receptacle having an open top, and including a pair of tubes connecting the ends of the heat exchanger with the inlet and outlet, respectively, of the conditioning and directing means, the tubes passing upwardly from said ends through the receptacle and out of the same through the open top thereof.

3. An aquarium as set forth in claim 1, wherein said directing means comprises a nozzle having an opening directly adjacent to and above the upper level of said filter.

4. An aquarium as set forth in claim 3, wherein said directing means includes a coupling extending through said bottom, a tube secured to the coupling and extending through said forming means and into said filter, said nozzle being secured to the upper end of the tube.

5. An aquarium as set forth in claim 1, wherein said forming means comprises a porous grid and a sidewall for spacing the grid above said bottom, said grid overlying a major portion of said bottom.

6. An aquarium as set forth in claim 5, wherein the filter is comprised of a mass of a particulate material, there being a non-toxic screen between the grid and the filter.

7. An aquarium as set forth in claim 1, wherein said heat exchanger is comprised of an inner metallic tube and an outer plastic tube surrounding the inner tube and being formed of a material which is non-toxic to the fish to be placed in the receptacle.

8. An aquarium as set forth in claim 7, wherein said metal is copper.

* * * * *